(12) United States Patent
Hsi

(10) Patent No.: US 7,336,886 B2
(45) Date of Patent: Feb. 26, 2008

(54) METHOD FOR PLAYBACK FLOW CONTROL

(75) Inventor: Chen-Ning Hsi, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 816 days.

(21) Appl. No.: 10/708,200

(22) Filed: Feb. 16, 2004

(65) Prior Publication Data
US 2005/0094969 A1 May 5, 2005

(30) Foreign Application Priority Data
Oct. 31, 2003 (TW) .............................. 92130572 A

(51) Int. Cl.
*H04N 5/91* (2006.01)
(52) U.S. Cl. ....................................................... 386/68
(58) Field of Classification Search ................. 725/91; 386/46, 68
See application file for complete search history.

(56) References Cited

U.S. PATENT DOCUMENTS

| 6,002,450 A | * | 12/1999 | Darbee et al. ............. 348/734 |
| 6,020,912 A | * | 2/2000 | De Lang .................... 725/91 |
| 6,040,823 A | * | 3/2000 | Seffernick et al. .......... 345/168 |
| 6,130,624 A | * | 10/2000 | Guyer ................... 340/825.69 |

FOREIGN PATENT DOCUMENTS

| DE | 3003 102 C2 | 1/1980 |
| DE | 197 52 599 A1 | 11/1997 |
| EP | 0 660 221 B1 | 3/2000 |
| EP | 1 318 519 A2 | 6/2003 |

\* cited by examiner

*Primary Examiner*—Thai Q. Tran
*Assistant Examiner*—Mishawn Dunn
(74) *Attorney, Agent, or Firm*—Winston Hsu

(57) ABSTRACT

A method for playing data in a playback apparatus is disclosed. The method includes playing the data stored in storing media installed in the playback apparatus with a playback acceleration.

13 Claims, 5 Drawing Sheets

METHOD FOR PLAYBACK FLOW CONTROL

BACKGROUND OF INVENTION

1. Field of the Invention

The invention relates to a method for playing data on a playback apparatus, and more particularly, to a method for playing data on a playback apparatus with different accelerations.

2. Description of the Prior Art

As multimedia technology progresses, playback apparatuses such as conventional tape recorders to digital video recorders are becoming more popular in families. However, improvements can still be made to playback flow control.

Generally, playback flow control is composed of play/pause, playback speed control, and playback direction control. Conventional playback speed control provides only a few selections of playback speed, e.g. from stop to 2 ×, 3×. However, these specific playback speeds cannot fully satisfy the user requirements. For instance, when searching for a specific scene, the user requires a faster speed when far from the specific scene, and a slower speed when close to the specific scene. Having only a limited selection of playback speeds does not satisfy this requirement. Moreover, when switching between the speed selections, the playback speed is directly switched, which results in a non-smooth and discontinuous transition. Please refer to FIG. 1 showing the relationship between the playback flow control and time according to the prior art. As shown in FIG. 1, at time point t1, the playback speed switches directly from stop to 2×, and at time point t2, the playback speed switches directly from 2× to 4×. In other words, the switching is not smooth.

SUMMARY OF INVENTION

It is therefore a primary objective of the claimed invention to provide a method for playback flow control to solve the problem mentioned above.

Briefly summarized, a method for playing data in a playback apparatus includes playing the data stored in a storing media installed in the playback apparatus with a playback acceleration.

The present invention also discloses a playback device including a storing module for storing data to be played, an input module for inputting control parameters of playback acceleration for the data to be played stored in the storing module, and a control module electrically connected to the storing module and the input module for playing the data stored in the storing module with the playback acceleration according to the control parameters of the playback acceleration received by the input module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
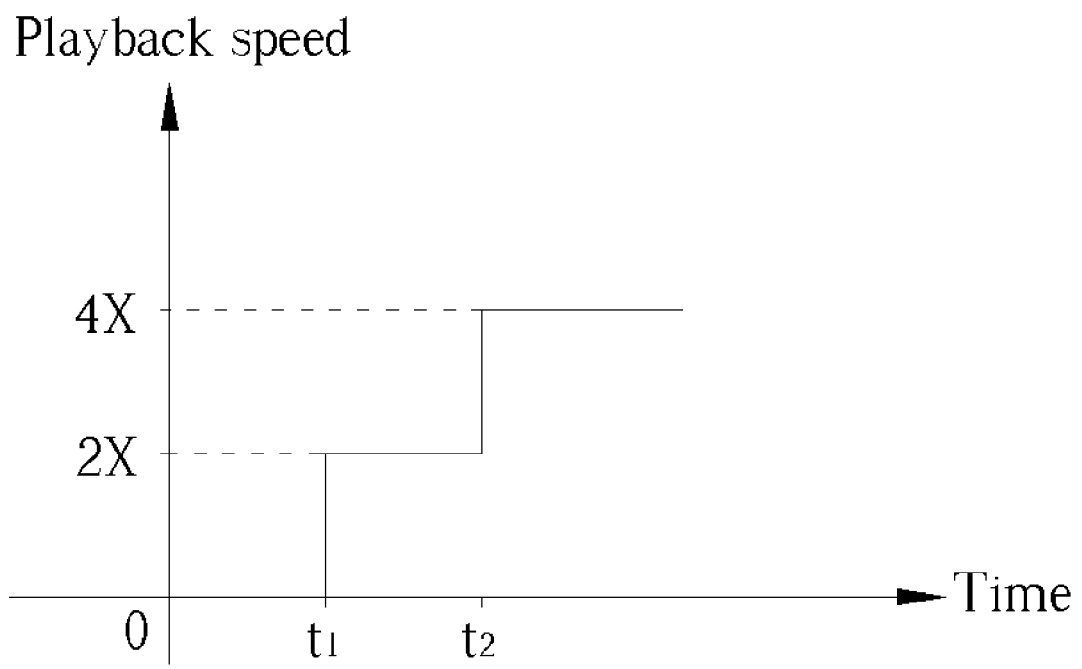
FIG. 1 illustrates the relationship between the playback flow control and time according to the prior art
Figure 2:
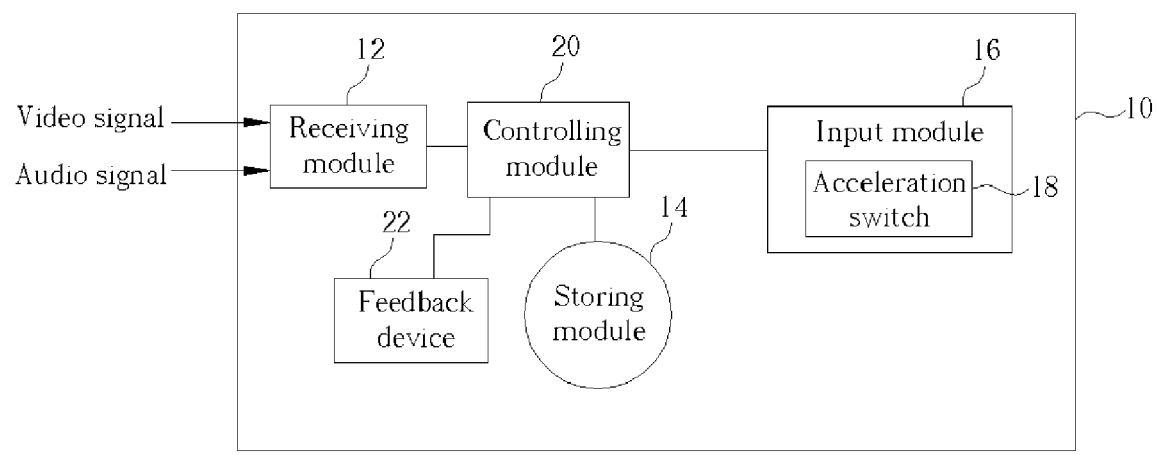
FIG. 2 is a block diagram of a playback apparatus according to the present invention.

Please refer to FIG. 2 showing a block diagram of a playback apparatus 10 according to the present invention. The playback apparatus 10 includes a receiving module 12 installed on a housing for receiving external video and audio signals; a storing module 14 being a read-only memory such as a DVD or VCD drive, a flash memory such as CF, SD or MMC card, or a hard disk drive or microdriver, for storing data to be played; and an input module 16 for inputting control parameters of playback acceleration for playing the data stored in the storing module 14.

The input module 16 includes an acceleration switch 18. When the acceleration switch 18 is turned on, the playback apparatus 10 plays the data with an acceleration corresponding to the on status of the acceleration switch 18. And when the acceleration switch 18 is released, the playback apparatus 10 plays the data with an acceleration corresponding to the release state of the acceleration switch 18. The acceleration switch 18 can be a lever. When the lever is pushed to a first direction, the playback apparatus 10 plays the data at increasing speeds according to a specific acceleration, and when the lever is pushed to a second direction, the playback apparatus 10 plays the data at decreasing speeds according to a specific deceleration. The acceleration and the deceleration are in direct proportion to the distance from the original position of the lever. When the lever goes back to the original position, the playback apparatus 10 plays the data uniformly at a constant speed. The acceleration switch 18 can also be a press switch such as a press key or a press ball. The press switch can be acceleration press switch or deceleration press switch, wherein the harder the switch is pressed, the faster the acceleration or deceleration. And when the press switch is released, the playback apparatus 10 plays the data uniformly at a constant speed. The acceleration switch 18 can also be a button switch that the playback apparatus 10 plays the data when the button is pressed for a specific time, and accelerates or decelerates the playback when the button is pressed for a time exceeding the specific time. Press longer to increase the acceleration or the deceleration, and press shorter to decrease the acceleration or the deceleration. That is, to determine the acceleration or the deceleration according to pressing time accumulation. The acceleration switch 18 can also be a two-way switch. When the switch is pushed to a first end, the playback apparatus 10 plays the data with a specific acceleration, when the switch is pushed to a second end, the playback apparatus 10 plays the data with a specific deceleration, and when the switch is released, the playback apparatus 10 plays the data uniformly at a constant speed. The acceleration switch 18 can also be other types of switches, in addition to the switches described above.

The playback apparatus 10 further includes a control module 20 electrically connected to the storing module 14 and the input module 16, for controlling the playback flow of the playback apparatus 10 to play the data stored in the storing module 14 with an acceleration according to the control parameters received by the input module 16; and a feedback device 22 for displaying the speed status of the playback apparatus 10. The feedback device 22 displays the speed status of the playback apparatus 10 by audio feedback, e.g. the feedback device 22 buzzes louder when the acceleration or the deceleration increases; by visual feedback, e.g. showing the speed status by a meter; or by force feedback, e.g. vibrating more vigorously when the acceleration or the deceleration increases.

The feedback device 22 can be used with the input module 16. When inputting larger acceleration or deceleration, the feedback device 22 feeds stronger force back so that it requires a larger resistance force to maintain the current acceleration or in order to input larger acceleration or deceleration. And when decreasing the acceleration or deceleration, the feedback device 22 releases the force so that the force feedback may decrease. The speed status previously mentioned can be acceleration mode or deceleration mode of the playback apparatus 10, acceleration rate or deceleration rate of the playback apparatus 10, or the current speed of the playback apparatus 10. The user can be easily noticed the speed status by a display of the feedback device 22.

Figure 3:
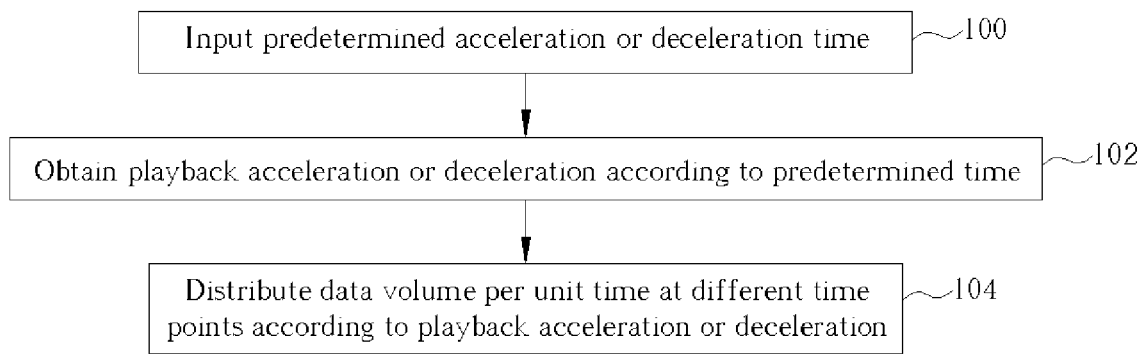
FIG. 3 is a flowchart of the playback apparatus playing data according to a first embodiment of the present invention.

Please refer to FIG. 3 showing a flowchart of the playback apparatus 10 playing data according to a first embodiment of the present invention as follows:

Step 100: Input a predetermined acceleration or deceleration time using the input module 16.

Step 102: Obtain playback acceleration or playback deceleration according to the predetermined acceleration or deceleration time.

Step 104: Distribute data volume per unit time at different time points according to the playback acceleration or playback deceleration.

The user can input the predetermined acceleration or deceleration time using the input module 16. For example, inputting the predetermined acceleration or deceleration time by pressing a switch. Press stronger to shorten the predetermined acceleration or deceleration time, e.g. when the press is lower than a predetermined level, the playback speed is accelerated to a specific speed in a predetermined time of 2 seconds, and when the press is over a level, the playback speed is accelerated to a specific speed in a predetermined time of 1 second. The specific playback speeds corresponding to the predetermined acceleration or deceleration times can be determined as required. Corresponding playback acceleration or deceleration can be calculated according to the predetermined acceleration or deceleration time by kinetic formulas. For instance, assume that the initial playback speed is Sa frame/s, in order to reach a target speed of Sb frame/s, subtract Sa from Sb and divide the result by the predetermined acceleration or deceleration time to obtain the playback acceleration or deceleration. The acceleration or deceleration is therefore uniform. That is, from the time when the predetermined acceleration or deceleration time is input, during the predetermined acceleration or deceleration time, the playback apparatus 10 plays the data with a uniform acceleration or deceleration until the playback speed reaches the target speed of Sb frame/s and the target speed becomes constant. Subsequently, distribute data volume per unit time at different time points according to the playback acceleration or playback deceleration by kinetic formula. For instance if Sa=30, Sb=60, and the predetermined acceleration time is 3 seconds, the playback acceleration is (60−30)/3=10 frame/s$^2$, thus during the acceleration time, the playback speed is 30+10=40 frame/s at the first second, 30+10*2=50 frame/s at the second second, 30+10*3=60 frame/s at the third second, and then the playback apparatus 10 plays the data at a uniform speed of 60 frame/s.

Figure 4:
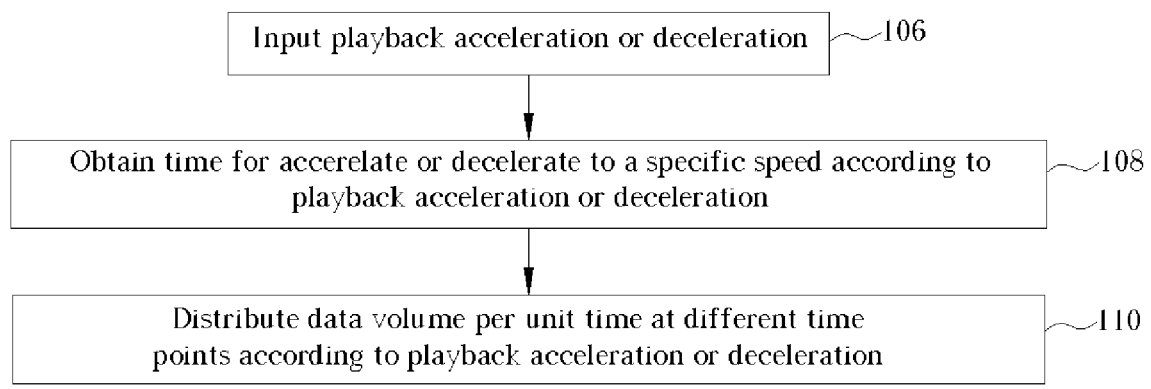
FIG. 4 is a flowchart of the playback apparatus playing data according to a second embodiment of the present invention.

Please refer to FIG. 4 showing a flowchart of the playback apparatus 10 playing data according to a second embodiment of the present invention as follows:

Step 106: Input the playback acceleration or playback deceleration using the input module 16.

Step 108: Obtain time for the playback apparatus 10 to accelerate or decelerate to a specific playback speed according to the playback acceleration or playback deceleration.

Step 110: Distribute data volume per unit time at different time points according to the playback acceleration or playback deceleration.

The user can input the playback acceleration or playback deceleration using the input module 16. For example, to input the playback acceleration or playback deceleration, use the press switch. Press stronger to increase the playback acceleration, e.g. when the press is below a certain force level, it takes a longer time to accelerate to a specific speed, and when the press is over the certain force level, it takes a shorter time to accelerate to a specific speed. The playback acceleration or playback deceleration corresponding to the input and the specific playback speed can be determined as required. Corresponding time for accelerating or decelerating to the specific playback speed can be calculated according to the playback acceleration or playback deceleration by kinetic formula. For instance, assume that the initial playback speed is Sa frame/s, in order to reach a target speed of Sb frame/s, subtract Sa from Sb and divide the result by the playback acceleration or playback deceleration. The playback apparatus 10 thereby plays the data with a uniform playback acceleration or deceleration until the speed reaches Sb frame/s, and the target speed is then kept constant. Subsequently, distribute data volume per unit time at different time points according to the playback acceleration or playback deceleration by kinetic formula. For instance, if Sa=30, Sb=60 and the predetermined acceleration time is 3 seconds, the playback acceleration is (60−30)/3=10 frame/s$^2$. Thus during the acceleration time, the playback speed is 30+10=40 frame/s at the first second, 30+10*2=50 frame/s at the second second, 30+10*3=60 frame/s at the third second, and then the playback apparatus 10 plays the data at a uniform speed of 60 frame/s. The method controls the playback acceleration instead of playback speed, so that the playback speed can be accelerated or decelerated smoothly.

Since the data is counted using a unit of video frame or audio sample, integer operations, instead of real number operation, are sufficient for calculating the distribution of data volume per unit time at different time points. Therefore, the operation is simplified to save the system resources of the playback apparatus 10 and reduce time on responding inputs to the system.

When distributing the data volume per unit time at different time points according to the playback acceleration or deceleration and the playback time, it is possible that the data cannot be completely distributed to different time points according to the playback acceleration or deceleration. For instance, if Sa=30, Sb=62 and the predetermined acceleration time is 3 seconds, the playback acceleration is (62−30)/3=10.67 frame/s$^2$, which can be regarded temporarily as 10 frame/s$^2$. Thus during the acceleration time, the playback speed is 30+10=40 frame/s at the first second, 30+10*2=50 frame/s at the second second, 30+10*3=60 frame/s at the third second, and then the remaining frames that cannot be completely divided to different time points are distributed. For example, keeping 40 frame/s at the first second and 50 frame/s at the second second but 62 frame/s at the third second, or keeping 40 frame/s at the first second but 51 frame/s at the second second and 62 frame/s at the third second. Thus, the playback acceleration or deceleration according to the present invention is not limited to uniform acceleration or deceleration.

Figure 5:
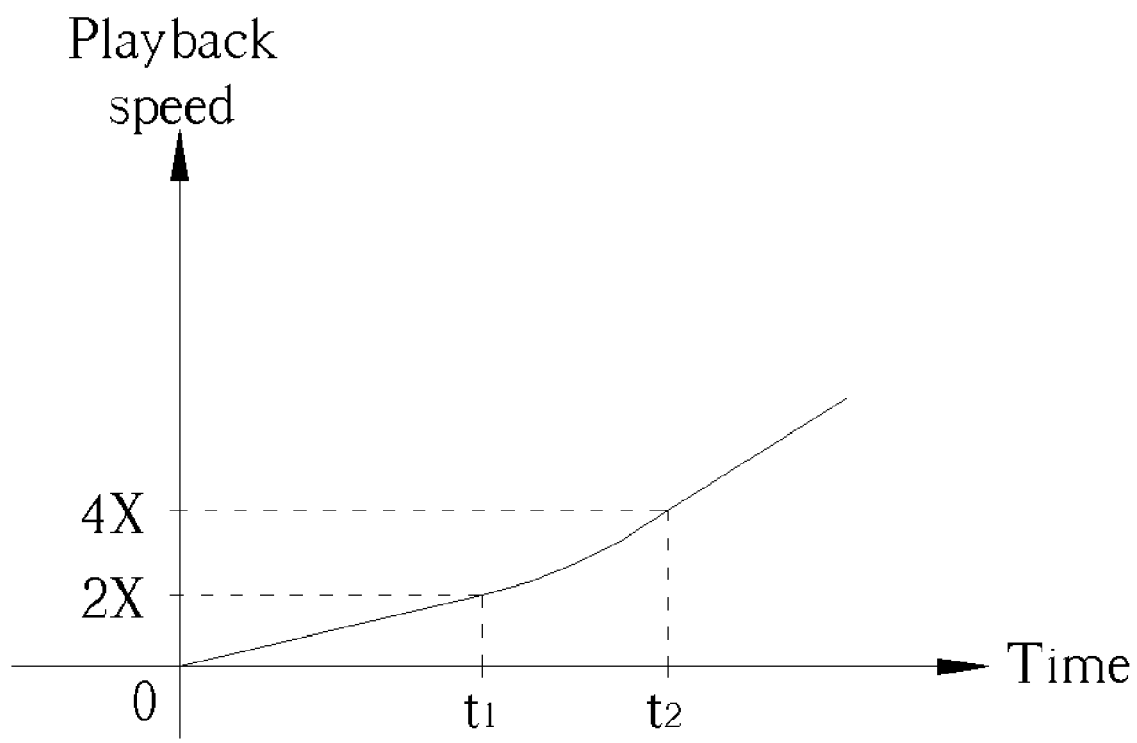
FIG. 5 illustrates the relationship between the playback flow control and time according to the present invention.

Please refer to FIG. 5 showing the relationship between the playback flow control and time according to the present invention. As shown in FIG. 5, from time point 0 to time point t1, the playback speed is accelerated smoothly from stop to 2×, and from time point t1 to time point t2, the playback speed is accelerated smoothly from 2× to 4×. Thus the acceleration or deceleration according to the present invention is smooth, which is completely different from the prior art by which the playback is neither continuous nor smooth.

The playback apparatus 10 can be an apparatus having a playback flow control interface. The method according to the present invention can be applied in playback or scene searching of a recorder, or automatic image displaying of a digital camera or playing any other continuous media, such as video data, audio data or motion pictures.

In contrast to the prior art, the present invention provides a method for playback flow control controlling playback acceleration instead of playback speed, so that the user can adjust the playback flow smoothly instead of controlling acceleration or deceleration with fixed factors or predetermined factors as in the prior art. When playing data, the playback speed is accelerated or decelerated smoothly, which is different from the prior art by which the playback is neither continuous nor smooth. Furthermore, using the input module 16 and the feedback module 22, the user can control and be notified of the speed status of the playback apparatus.

Those skilled in the art will readily observe that numerous modifications and alterations of the method and device may be made while retaining the teachings of the invention. Accordingly, the above disclosure should be construed as limited only by the metes and bounds of the appended claims.

The invention claimed is:

1. A method for playing data in a playback apparatus, the method comprising:
   calculating a playback acceleration of data to be played in the playback apparatus according to an acceleration time, an initial playback speed, and a target playback speed; and
   playing the data stored in a storing media installed in the playback apparatus with the calculated playback acceleration.

2. The method of claim 1, wherein the playback acceleration is positive or negative but not zero.

3. The method of claim 1, wherein the playback acceleration is uniform.

4. A playback device comprising:
   a storing module for storing data to be played;
   an input module for inputting control parameters of playback acceleration of the data to be played stored in the storing module; and
   a control module electrically connected to the storing module and the input module, for calculating the playback acceleration of data to be played in the playback device according to an acceleration time, an initial playback speed, and a target playback speed received by the input module, and for playing the data stored in the storing module with the calculated playback acceleration.

5. The device of claim 4, wherein the input module comprises an acceleration switch, and the playback device plays the data with an acceleration corresponding to the on status of the acceleration switch when the acceleration switch is turned on, and plays the data with a uniform speed when the acceleration switch is released.

6. The device of claim 5, wherein the acceleration switch is a lever.

7. The device of claim 5, wherein the acceleration switch is a press switch.

8. The device of claim 4, wherein the playback device further comprises a feedback device for indicating the speed status of the playback device.

9. The device of claim 8, wherein the feedback device indicates the speed status of the playback device using audio feedback.

10. The device of claim 8, wherein the feedback device indicates the speed status of the playback device using visual feedback.

11. The device of claim 8, wherein the feedback device indicates the speed status of the playback device using force feedback.

12. The device of claim 4, wherein the playback acceleration is positive or negative but not zero.

13. The device of claim 4, wherein the playback acceleration is uniform.

\* \* \* \* \*